(12) United States Patent
Muhanna et al.

(10) Patent No.: US 7,545,766 B1
(45) Date of Patent: Jun. 9, 2009

(54) METHOD FOR MOBILE NODE-FOREIGN AGENT CHALLENGE OPTIMIZATION

(75) Inventors: Ahmad Muhanna, Richardson, TX (US); Pete Wenzel, Plano, TX (US); Pierre Boulos, Richardson, TX (US)

(73) Assignee: Nortel Networks Limited, St. Laurent, Quebec (CA)

( * ) Notice: Subject to any disclaimer, the term of this patent is extended or adjusted under 35 U.S.C. 154(b) by 699 days.

(21) Appl. No.: 10/838,095

(22) Filed: May 3, 2004

Related U.S. Application Data

(60) Provisional application No. 60/471,325, filed on May 16, 2003.

(51) Int. Cl.
*H04W 4/00* (2009.01)

(52) U.S. Cl. .............. 370/328; 370/338; 370/401; 370/352; 370/331; 455/432.1; 455/433; 455/436; 455/435.1; 455/411

(58) Field of Classification Search ......... 370/350–351, 370/335, 342, 338, 328, 352–356, 401; 455/437, 455/432.1–436, 410–411; 709/203–206
See application file for complete search history.

(56) References Cited

U.S. PATENT DOCUMENTS

| | | | | |
|---|---|---|---|---|
| 5,787,082 | A * | 7/1998 | Bennett et al. ............. | 370/388 |
| 6,172,986 | B1 * | 1/2001 | Watanuki et al. ........... | 370/466 |
| 6,359,888 | B1 * | 3/2002 | Koch et al. ................. | 370/394 |
| 6,430,698 | B1 * | 8/2002 | Khalil et al. ............... | 714/4 |
| 6,442,616 | B1 * | 8/2002 | Inoue et al. ................ | 709/245 |
| 6,522,880 | B1 * | 2/2003 | Verma et al. ............... | 455/436 |
| 6,578,085 | B1 * | 6/2003 | Khalil et al. ............... | 709/241 |
| 6,771,623 | B2 * | 8/2004 | Ton ............................ | 370/331 |
| 6,795,705 | B1 * | 9/2004 | Warrier et al. ............ | 455/435.1 |
| 6,850,530 | B1 * | 2/2005 | Waclawsky et al. ........ | 370/401 |
| 6,850,532 | B2 * | 2/2005 | Thubert et al. ............. | 370/401 |
| 6,925,075 | B2 * | 8/2005 | Karagiannis ................ | 370/388 |
| 6,973,068 | B2 * | 12/2005 | Inoue et al. ................. | 370/338 |
| 6,982,967 | B1 * | 1/2006 | Leung ........................ | 370/328 |
| 6,990,086 | B1 * | 1/2006 | Holur et al. ................ | 370/329 |
| 7,023,828 | B2 * | 4/2006 | Korus et al. ................ | 370/338 |
| 7,269,727 | B1 * | 9/2007 | Mukherjee et al. ......... | 713/160 |
| 7,275,260 | B2 * | 9/2007 | de Jong et al. .............. | 726/10 |
| 7,366,145 | B2 * | 4/2008 | Flinck ........................ | 370/338 |

(Continued)

OTHER PUBLICATIONS

Perkins, C. (ed); "RFC 3344: IP Mobility Support for IPv4"; Network Working Group (Aug. 2002).

(Continued)

*Primary Examiner*—Sharad Rampuria
(74) *Attorney, Agent, or Firm*—D. Scott Hemingway; Hemingway & Hansen, LLP

(57) ABSTRACT

The present invention supports an authentication protocol on a foreign agent to avoid rejecting re-registration request when congestion has delayed receipt at a mobile node of a foreign agent challenge code in a registration reply or agent advertisement message. Upon receipt of a re-registration request message containing a stale foreign agent challenge code, the identification code of the re-registration request message is compared to the identification code of the previous valid registration request message. If the identification code is greater than and not equal to the identification code in the previous valid request message, the foreign agent authenticates the message. The authenticated registration request message is processed to reset the lifetime so the communication session can continue.

24 Claims, 5 Drawing Sheets

U.S. PATENT DOCUMENTS

| | | | | |
|---|---|---|---|---|
| 2001/0046223 | A1* | 11/2001 | Malki et al. | 370/338 |
| 2002/0067704 | A1* | 6/2002 | Ton | 370/329 |
| 2003/0166397 | A1* | 9/2003 | Aura | 455/410 |
| 2003/0171112 | A1* | 9/2003 | Lupper et al. | 455/414.1 |
| 2004/0090941 | A1* | 5/2004 | Faccin et al. | 370/338 |
| 2004/0100951 | A1* | 5/2004 | O'neill | 370/389 |
| 2005/0089046 | A1* | 4/2005 | Moussa et al. | 370/395.52 |
| 2006/0182083 | A1* | 8/2006 | Nakata et al. | 370/352 |

OTHER PUBLICATIONS

Perkins, C. (ed); "RFC 3220: IP Mobility Support for IPv4"; Network Working Group (Jan. 2002).

Perkins, C. (ed); "RFC 2002: IP Mobility Support for IPv4"; Network Working Group (Oct. 1996).

Perkins, C. and P. Perkins; "RFC 3012: Mobile for IPv4 Challenge/Response Extensions"; Network Working Group (Nov. 2000).

Wekstrom, T.; "Mobile IP, its extensions and practical use cases"; Lifix Systems Oy (2002).

Jain, P. and Rakesh Kelkar; "Mobile IP: Enabling Mobility for the 3G Wireless Internet"; Tata Consultancy Services (Apr. 2003).

* cited by examiner

METHOD FOR MOBILE NODE-FOREIGN AGENT CHALLENGE OPTIMIZATION

RELATED APPLICATION DATA

This application is related to Provisional Patent Application Ser. No. 60/471,325 filed on May 16, 2003, and priority is claimed for this earlier filing under 35 U.S.C. § 120. The Provisional Patent Application is also incorporated by reference into this utility patent application.

TECHNICAL FIELD OF THE INVENTION

A communication protocol for information packet transmissions from a Mobile Node to a Foreign Agent in a mobile IP session.

BACKGROUND OF THE INVENTION

The Internet, like so many other high tech developments, grew from research originally performed by the United States Department of Defense. In the 1960s, the military had accumulated a large collection of incompatible computer networks. Because of their incompatible data structures and transmission protocols, many of these computers could not communicate with other computers across network boundaries.

In the 1960s, the Defense Department wanted to develop a communication system that would permit communication between these different computer networks. Recognizing that a single, centralized communication system would be vulnerable to attacks or sabotage, the Defense Department required that the communication system be decentralized with no critical services concentrated in vulnerable failure points. In order to achieve this goal, the Defense Department established a decentralized communication protocol for communication between their computer networks.

A few years later, the National Science Foundation (NSF) wanted to facilitate communication between incompatible network computers at various research institutions across the country. The NSF adopted the Defense Department's protocol for communication, and this combination of research computer networks would eventually evolve into the Internet.

Internet Protocols

The Defense Department's communication protocol governing data transmission between different networks was called the Internet Protocol (IP) standard. The IP standard has been widely adopted for the transmission of discrete information packets across network boundaries. In fact, the IP standard is the standard protocol governing communications between computers and networks on the Internet.

The IP standard identifies the types of services to be provided to users and specifies the mechanisms needed to support these services. The IP standard also specifies the upper and lower system interfaces, defines the services to be provided on these interfaces, and outlines the execution environment for services needed in the system.

A transmission protocol, called the Transmission Control Protocol (TCP), was developed to provide connection-oriented, end-to-end data transmission between packet-switched computer networks. The combination of TCP with IP (TCP/IP) forms a suite of protocols for information packet transmissions between computers on the Internet. The TCP/IP standard has also become a standard protocol for use in all packet switching networks that provide connectivity across network boundaries.

In a typical Internet-based communication scenario, data is transmitted from an originating communication device on a first network across a transmission medium to a destination communication device on a second network. After receipt at the second network, the packet is routed through the network to a destination communication device. Because standard protocols are used in Internet communications, the IP protocol on the destination communication device decodes the transmitted information into the original information transmitted by the originating device.

TCP/IP Addressing and Routing

A computer operating on a network is assigned a unique physical address under the TCP/IP protocols. This is called an IP address. The IP address can include: (1) a network ID and number identifying a network, (2) a sub-network ID number identifying a substructure on the network, and (3) a host ID number identifying a particular computer on the sub-network. A header data field in the information packet will include source and destination addresses. The IP addressing scheme imposes a consistent addressing scheme that reflects the internal organization of the network or sub-network.

A router is used to regulate the transmission of information packets into and out of the computer network. Routers interpret the logical address contained in information packet headers and direct the information packets to the intended destination. Information packets addressed between computers on the same network do not pass through the router to the greater network, and as such, these information packets will not clutter the transmission lines of the greater network. If data is addressed to a computer outside the network, the router forwards the data onto the greater network.

TCP/IP network protocols define how routers determine the trans-mission path through a network and across network boundaries. Routing decisions are based upon information in the IP header and corresponding entries in a routing table maintained on the router. A routing table contains the information for a router to determine whether to accept an information packet on behalf of a device or pass the information packet onto another router.

Routing tables can be configured manually with routing table entries or with a dynamic routing protocol. A manual routing table can be configured upon initialization. In a dynamic routing protocol, routers update routing information with periodic information packet transmissions to other routers on the network. The dynamic routing protocol accommodates changing network topologies, network architecture, network structure, layout of routers, and interconnection between hosts and routers.

The IP-Based Mobility System

The Internet protocols were originally developed with an assumption that Internet users would be connected to a single, fixed network. With the advent of cellular wireless communication systems, such as mobile communication devices, the movement of Internet users within a network and across network boundaries has become common. Because of this highly mobile Internet usage, the implicit design assumption of the Internet protocols (e.g. a fixed user location) is violated by the mobility of the user.

In an IP-based mobile communication system, the mobile communication device (e.g. cellular phone, pager, computer, etc.) can be called a Mobile Node. Typically, a Mobile Node maintains connectivity to its home network through a foreign network. The Mobile Node will always be associated with its home network for IP addressing purposes and will have information routed to it by routers located on the home and foreign networks. The routers can be referred to by a number of names including Home Agent, Home Mobility Manager, Home Location Register, Foreign Agent, Serving Mobility Manager, Visited Location Register, and Visiting Serving Entity.

While coupled to a foreign network, the Mobile Node will be assigned a care-of address. This is a temporary IP address assigned by the Foreign Agent on the foreign network. The care-of address corresponds to the communication link of the Mobile Node to the foreign network and is used by routers on the foreign network to route information packets addressed to the Mobile Node. While residing on a foreign network, a Mobile Node may move from one location to another, changing its connectivity to the network. This movement changes the physical location of the Mobile Node and requires updating routing tables and/or care-of addressing to keep up with the movement of the Mobile Node.

The Mobile Node keeps the Home Agent informed of its current location by registering the care-of address with the Home Agent. Essentially, the care-of address represents the current foreign network address where the Mobile Node is located. If the Home Agent receives an information packet addressed to the Mobile Node while the Mobile Node is located on a foreign network, the Home Agent will "tunnel" the information packet to the Mobile Node's current location on the foreign network via the applicable care-of address assigned by the Foreign Agent to route the information packet to the connected Mobile Node.

In some system architectures and protocols, Foreign Agents also participate in transmission of information packets to a resident Mobile Node. The Foreign Agents receive information packets forwarded from the Home Agent to de-tunnel and forward to the Mobile Node. Further, the Foreign Agent serves as a default router for out-going information packets generated by the mobile node while connected to the foreign network. Foreign Agents and Home Agents can route information packets using successive transmission hops to route information packets from router-to-router to and from a Mobile Node. The registered care-of address identifies the location on a foreign network of the Mobile Node, and the Home Agent and Foreign Agent use this care-of address for routing information packets to and from the foreign network.

Registration of a Mobile Node

Foreign Agents and Home Agents periodically broadcast an agent advertisement to all nodes on the local network associated with that agent. An agent advertisement is a message from the agent on a network that may be issued under the Mobile IP protocol (RFC 2002) or any other type of communications protocol. This advertisement should include information that is required to uniquely identify a mobility agent (e.g. a Home Agent, a Foreign Agent, etc.) to a mobile node. Mobile Nodes examine the agent advertisement and determine whether they are connected to the home network or a foreign network.

If the Mobile Node is located on its home network, no additional actions need to be taken because information packets will be routed to the Mobile Node according to the standard addressing and routing scheme. If the Mobile Node is visiting a foreign network, however, the Mobile Node obtains appropriate information from the agent advertisement, and transmits a registration request message to its Home Agent. This registration request is routed through the Foreign Agent and includes a care-of address for the Mobile Node.

Typically, the Home Agent transmits a registration reply message back to the Mobile Node to confirm that the registration process has been successfully completed. This registration reply message is transmitted using the care-of address and routing through the Foreign Agent to the Mobile Node. Upon initial connection, a registration lifetime on the connection is initiated. At the expiration of this lifetime, the communication session terminates freeing the communication network resources. Periodically during this lifetime, the registration request and responding reply messages are generated in turn to reinitiate the lifetime and confirm the continuing connection and requirement for the foreign and home network resources to support the communication. The registration reply and registration requests occur periodically to ensure resources are not perpetually committed to non-existent communications.

Authenticate, Authorize and Accounting ("AAA")

In an IP-based mobile communications system, the Mobile Node changes its point of attachment to the network while maintaining network connectivity. The Mobile IP Protocol (RFC 2002) assumes that mobile IP communications with a Mobile Node will be performed on a single administrative domain or a single network controlled by one administrator.

When a Mobile Node travels outside its home administrative domain, however, the Mobile Node must communicate through multiple domains in order to maintain network connectivity with its home network. While connected to a foreign network controlled by another administrative domain, network servers must authenticate, authorize and collect accounting information for services rendered to the Mobile Node. This authentication, authorization, and accounting activity is called "AAA", and AAA servers on the home and foreign network perform the AAA activities for each network.

Authentication is the process of proving someone's claimed identity, and security systems on a mobile IP network will often require authentication of the system user's identity before authorizing a requested activity. The AAA server authenticates the identity of an authorized user, and authorizes the Mobile Node's requested activity. Additionally, the AAA server will also provide the accounting function including tracking usage and charges for use of transmissions links between administrative domains.

The registration request and registration reply messages are used in the AAA process. These messages contain data fields containing AAA information for processing by the AAA servers and the Home Agent and Foreign Agent for some protocols. Two data attributes carried within the registration request and reply messages are a message identifier and a Foreign Agent "challenge."

The challenge is a random number code generated by the Foreign Agent and used by the Foreign Agent to confirm the legitimacy of received messages, such as registration request messages, locally at the Foreign Agent during a communication session. Upon receipt of the Foreign Agent challenge code, the Mobile Node stores the code for subsequent use in the next registration request message. A re-registration request message containing a prior, expired challenge code, commonly referred to as "stale", received by the Foreign Agent from the Mobile Node will not be authenticated and the Foreign Agent will not re-register the Mobile Node. Eventually, the connection terminates when the lifetime expires without re-registration. This security protocol operating on the Foreign Agent prevents replay transmissions by a hacker attempting to hijack communication network resources for unauthorized access to and use of the communication network using stale challenge codes in intercepted and re-transmitted communications. This replay protection ensures that such invalid messages are not accepted by the foreign network and are detected as invalid.

The message identifier is used to identify a message sent on the network. Each message generated on the network by a component node carries a unique identifier code. Typically, this message identifier code is a timestamp representing the time that the message is generated. A registration request message containing a previously used message identifier, or stale timestamp, will not be authenticated at the Home Agent and the Home Agent will not respond with a registration reply message to the Mobile Node. Eventually, the system terminates the connection when the lifetime expires without re-registration. This security protocol prevents replay transmissions by a hacker attempting to hijack communication network resources for unauthorized access to and use of the communication network by using intercepted and retransmitted communication. This replay protection ensures that such invalid messages are not accepted by the home network and are detected as invalid.

A problem arises on communication networks when there is congestion and registration or reply messages are lost or delayed. If a Mobile Node does not receive a registration reply message in response to its registration request message for re-registration, the Mobile Node may retransmit a registration request message with the same challenge code (e.g. an expired or stale challenge) but a different identifier code. If the successful registration reply message relayed by the Foreign Agent is lost or arrives late at the Mobile Node after the Mobile Node retransmitted a registration request message, the Foreign Agent receives the Mobile Node retransmitted registration request message containing a stale challenge. If either of these events occurs, the Foreign Agent rejects the registration request message. If congestion continues, the Mobile Node may retransmit the registration request message before receiving the registration reply message with the stale challenge code. If this occurs during Mobile Node re-registration, an infinite loop may develop until the Mobile Node registration lifetime expires, terminating the connection.

SUMMARY OF THE INVENTION

The invention is an enhanced communication security protocol for the Foreign Agent to handle registration request messages containing a stale challenge code. If a registration request message is received with a stale challenge code, the Foreign Agent verifies the following: 1) that the Mobile Node is in a registered state; 2) that the identifier code of the retransmitted registration request message is not the same as the registration request message or has a lesser value; and 3) that the identifier code of the retransmitted registration request number is greater than the identifier of the last received registration request message. If these conditions are met, then the Foreign Agent will accept and authenticate the registration request message.

BRIEF DESCRIPTION OF THE DRAWINGS

The objects and features of the invention will become more readily understood from the following detailed description and appended claims when read in conjunction with the accompanying drawings in which like numerals represent like elements and in which:

DETAILED DESCRIPTION OF THE PREFERRED EMBODIMENTS

Figure 1:
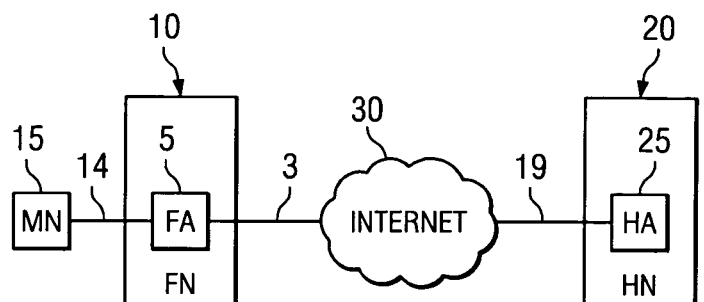
FIG. 1 is a schematic diagram of a architecture for a mobile IP wireless communications network utilizing the invention.

FIG. 1 shows a schematic diagram of an architecture for a mobile IP wireless communications network utilizing the invention. A Mobile Node (MN) 15 is coupled to a Foreign Agent (FA) 5 on a Foreign Network (FN) 10 by communication link 14. Typically, the communication link 14 is a wireless communication link coupling the MN 15 and the FA 5 supporting wireless communication, such as a cellular phone system, but this link can also be a wired communication link to a mobile device using a plug-in communication connection to the FA 5.

The FA 5 is coupled to the Internet 30 by communication link 3, and to the Home Agent (HA) 25 of the MN 15 on the Home Network (HN) 20 by communication link 19. The communication pathway formed by the communication link 3, Internet 30, and communication link 19 can include one or more wireless communication links and even additional communication networks. This communication system formed by the MN 15, FN 10, Internet 30, and HN 20 supports information packet-based communication between the MN 15, the HN 20, and FN 10.

Figure 2:
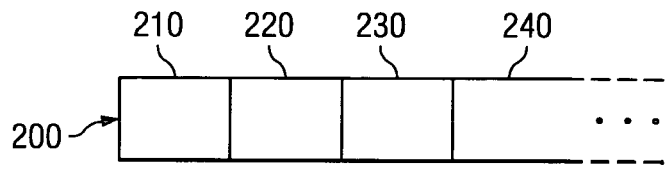
FIG. 2 is a representation of an information packet.

The general format of an information packet used in the invention for the packet-based communication system in FIG. 1 is shown in FIG. 2. Information packets use an encoding format of "1" and "0" data bits to build a data stream that a computer can interpret. The information packet 200 has an IP header data field 210 that generally contains a source and destination address. The actual length and format of the IP address header 220 is dependent on the actual communication protocol being used (e.g. IPv4 or IPv6). The next data field is the User Data Protocol (UDP) or Internet Control Message Protocol (ICMP) data field 220. The UDP data field is almost a null protocol in IP services, because the only services it provides over IP are checksumming of data and multiplexing by port number. The ICMP messages provide feedback about problems in the communication environment. In mobile IP, the next data field is the Mobile IP data field 230, and this data field designates whether the information packet is a registration request or registration reply message. The Mobile IP data field is followed by a variable length data payload section 240 containing the actual information being transmitted from the originating source to the destination source.

Figure 3:
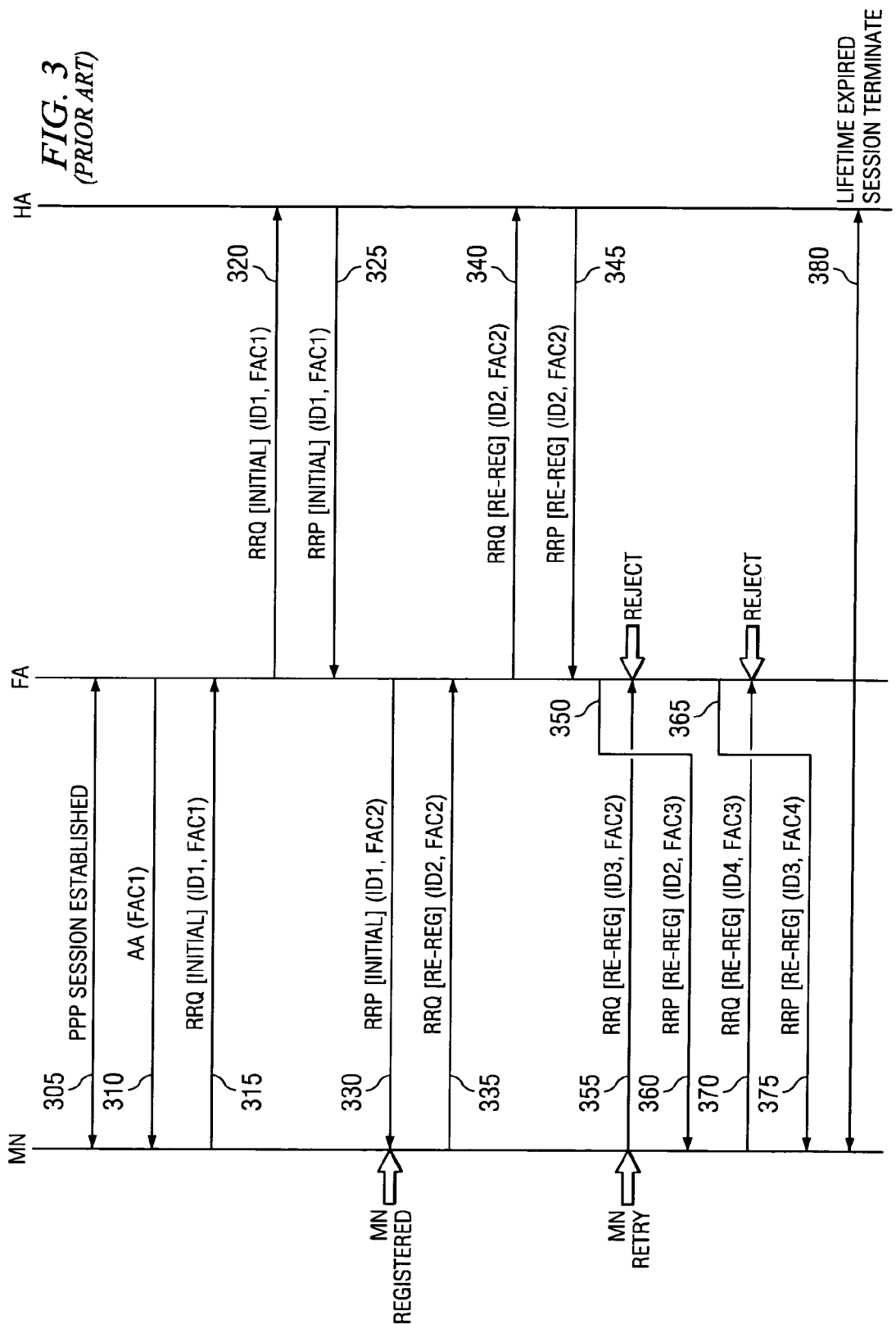
FIG. 3 is a message flow chart showing the registration and verification process under the prior art.

FIG. 3 is a message flow chart under the prior art demonstrating the problem that can develop. In step 305, a Point-to-Point Protocol (PPP) communication session with a Mobile Node (MN) is established. At step 310, the Foreign Agent (FA) transmits an agent advertisement (AA) containing a first FA challenge number (FAC1). The first challenge number is a random number code generated by the FA that should be at least 32 bits in length. The agent advertisement message is received by the MN which stores the FAC1 in a memory to use in the control messages it transmits until updated with a new number. By using the FAC1 to authenticate a message, the FA prevents replay attacks by rejecting any control messages that contain stale challenge numbers.

In step 315, the MN transmits an initial registration request message (RRQ) to the FA containing the FAC1 and a message identifier code (ID1). This identifier code is preferably a timestamp to establish a unique identifier for messages generated by the MN on the network and is used to match a registration request message with a registration reply message. If a registration request message is sent with a duplicated identifier code, it will be rejected by the HA. This is another component of the authentication protocols used to prevent replay attacks on the communication network.

At step 320, the FA transmits the initial registration request message (RRQ) to the Home Agent (HA) which includes the ID1 and the FAC1. The HA authenticates the identity of the MN and at step 325 generates and transmits an initial registration reply message (RRP) containing the ID1 and FAC1 attributes to the FA. In step 330, the FA correlates the RRP with the initial RRQ received in step 315 and transmits an initial registration reply message (RRP) with a new, second challenge code (FAC2) to use in any subsequent control message. After receiving the RRP message, the MN processes the information completing the registration process. The MN is now registered with the FA and HA and can now receive and transmit information packets in the communication session.

At the time of initiation, a lifetime clock is initiated. To reset the clock, periodic registration requests are generated by the MN to re-register the MN. At step 335, the MN transmits a registration request message (RRQ) to the FA to re-register with the FA and the HA and reset the life-time clock. The RRQ contains a new identifier code (ID2) and the new challenge (FAC2) received by the MN in step 330. In step 340, the FA transmits the registration request message to the HA so the HA can authenticate the identity of the MN and re-register the MN. In step 345, the HA transmits a registration reply message (RRP) 345 confirming re-registration of the MN. The RRP includes the identifier (ID2) and the second FA challenge code (FAC2) for processing the message.

In step 350, the FA transmits the RRP replying to the RRQ in step 335 to the MN containing the identifier code (ID2) and a new third FA challenge (FAC3). However, this message is delayed by congestion, such as when the MN is downloading a large file, and does not arrive before a timeout occurs and the MN transmits a second registration request message (RRQ) in step 355 because of failure to receive the RRP within an allocated time after step 335. The message transmitted at step 355 includes a new, third identifier (ID3) and the old challenge (FAC2). The ID3 will have a timestamp value higher than ID2, indicating that the information packet was formed subsequent to the information packet in step 335. However, because the information packet contains the stale FAC2 code number, the re-registration request number is rejected.

At step 360, the delayed registration reply message containing the ID2 identifier and the new FAC3 arrives at the MN. The MN updates its memory with the new FAC3 to use to authenticate its next control message. But because the identifier does match the ID3 that the MN is expecting, the message is discarded due to the identifier mismatch. At step 365, the FA transmits another registration reply message containing a new challenge code (FAC4), the identifier code ID3 designating the message as a reply to the RRQ message in step 355, and a code signifying the request is rejected because of the stale challenge. This message is again delayed by traffic congestion on the network.

In step 370, before receipt of the delayed registration reply message, the MN transmits another registration request message to re-register the MN containing ID4 and FAC3. The ID4 timestamp code indicates that the message was transmitted subsequent to the message in step 335, but the FAC3 is not the FAC4 challenge code the FA is expecting. This registration request message is also rejected because of the stale challenge code. In step 380, before another attempt can be made to re-register the MN, the lifetime expires and the session terminates.

Figure 4:
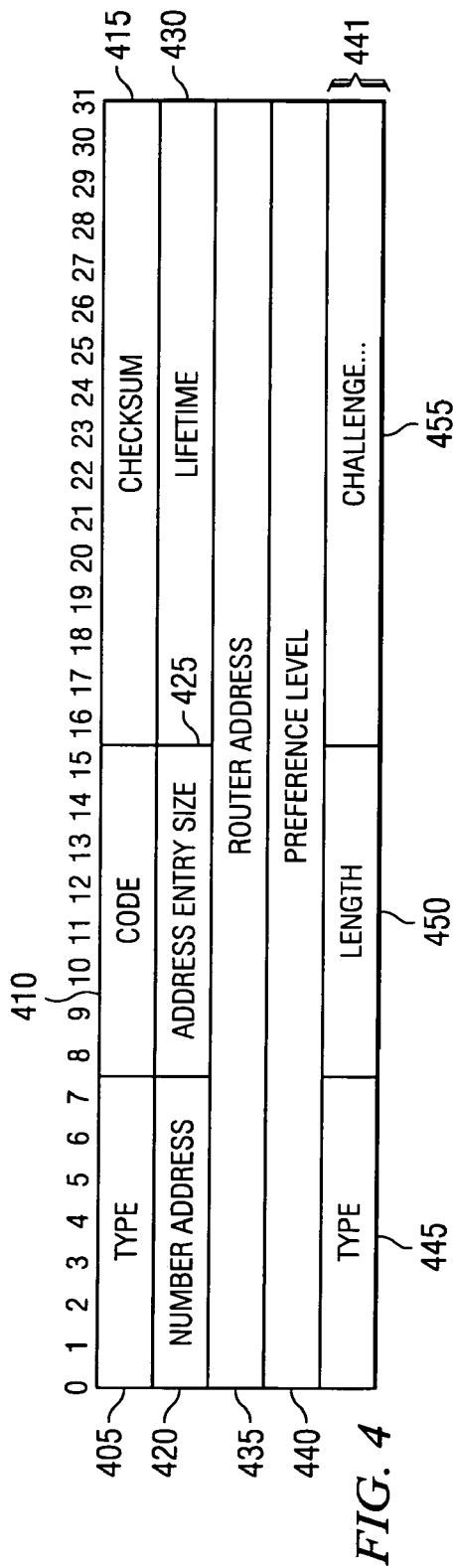
FIG. 4 is a format for an agent advertisement message used in the invention.

A format for an agent advertisement message to register a challenge code number with the Mobile Node is shown in FIG. 4. This is a standard format found in RFC 1256 and follows the IP header. The TYPE data field 405 is one octet long and has a value "9" which signifies that the message type is a router advertisement message. The CODE data field 410 is one octet long and has a value of "0". The CHECKSUM data field 415 is two octets long that specifies the number of bits in the information packet so that the receiver can check to see that the same number of bits arrived. Both the TCP and UDP communication layers provide a checksum count and verification. The NUMBER ADDRESS data field 420 is one octet long and is the number of addresses advertised in the message. The ADDRESS ENTRY SIZE data field 425 is one octet long and is the number of 32-bit "words" of information per each router address. For Internet Protocol version 4 this number is 2. The LIFETIME data field 430 is one octet long and specifies the maximum number of seconds that the router (e.g. the Foreign Agent) address may be considered valid.

The ROUTER ADDRESS data field 435 designates the IP address of the Foreign Agent transmitting the agent advertisement message. The PREFERENCE LEVEL data field 440 indicates the preferability of the Foreign Agent as a default router address relative to other router addresses on the same sub-network.

The Challenge Extension 441 includes a TYPE, LENGTH, and the CHALLENGE data field. The TYPE data field 445 is one octet long and has an assigned value of "24". The LENGTH data field 450 is one octet long and is the length of the CHALLENGE in octets. The CHALLENGE data field 450 is a random value number at least 32-bits long and used to transmit the initial or a subsequent, updated challenge value to a Mobile Node and authenticate the registration request message. This CHALLENGE code value 450 is generated by the Foreign Agent to provide a local assurance at the Foreign Agent that the Mobile Node is not replaying an earlier registration request.

Figure 5:
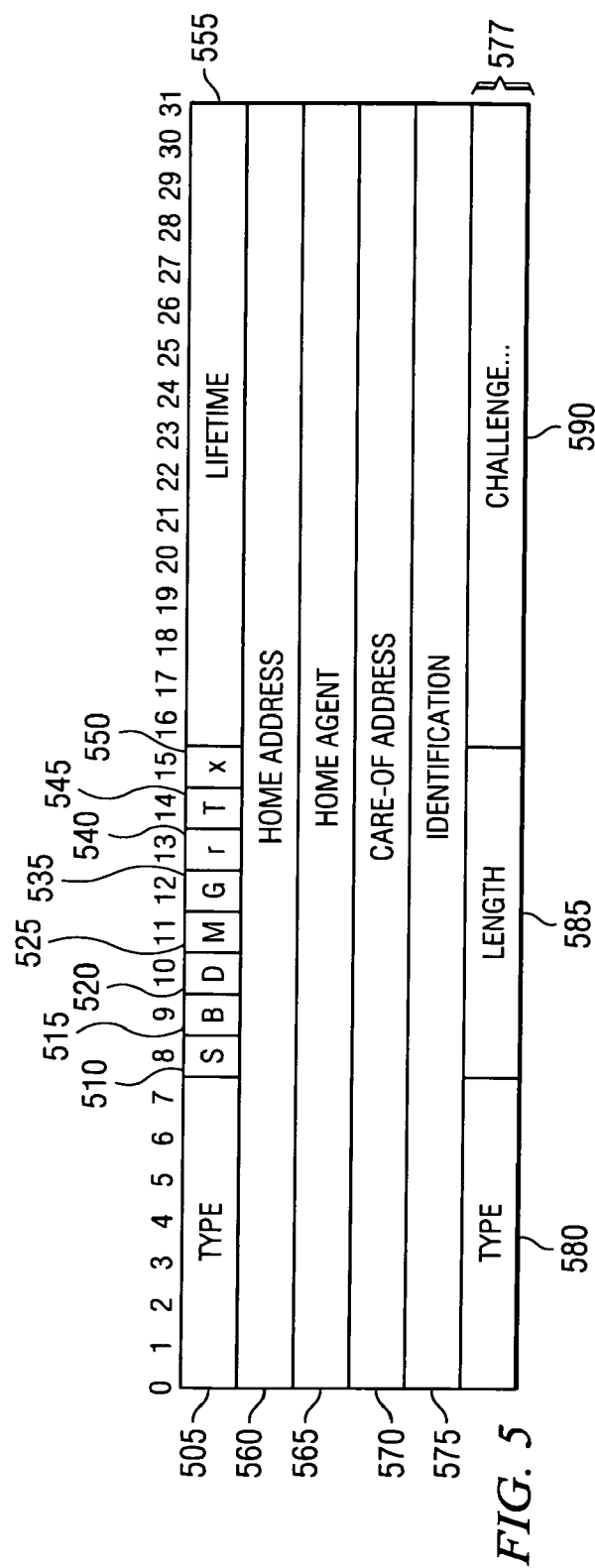
FIG. 5 is a format for a registration request message used in the invention.

The format for a registration request message containing a Challenge code is shown in FIG. 5. The registration request message follows the UDP header and includes 18 data fields. The TYPE data field 505 is one octet long and has a value of "1". When set with a value of "1", the S-bit field 510 signifies a MN request for the Home Agent to retain its prior mobility bindings. When set with a value of "1", the B-bit data field 515 indicates a request that the Home Agent tunnel to it any broadcast information packets that it receives on the home network. If the D-bit data field 525 is set to a value of "1", the MN will decapsulate information packets sent to the care-of address. When the M-bit data field 525 is set to a value of "1", the M-bit field 525 signifies a MN request that its Home Agent use minimal encapsulation for information packets tunneled to the MN. The G-bit field 535 when set with a value of "1" signifies a request to the Home Agent to use Generic Routing Encapsulating (GRE) protocol tunneling for information packets tunneled to the MN. The r-bit field 540 is a null with a value of "0" that is ignored on reception. When set with a value of "1", the T-bit field 545 signifies a MN request to the Home Agent for reverse tunneling. The x-bit field 550 is also a null with a value of "0" that is ignored.

The LIFETIME data field 555 is the number of seconds remaining before the registration is considered expired. A value of "0" indicates a request for deregistration. The HOME ADDRESS data field 560 is the IP address of the MN on the home network. The HOME AGENT data field 565 is the IP address of the MN's Home Agent on the home network. The CARE-OF ADDRESS data field 570 is the IP address for the communication link of the MN to the foreign network (e.g. the IP address for the end of the tunnel used to route information packets from the home network to the MN). The IDENTIFICATION data field 575 is the 64-bit number identifier generated by the MN for matching a RRQ with a RRP.

The Challenge extension 577 includes three data fields. The TYPE data field 580 is one octet long and has an assigned value of "24". The LENGTH data field 585 is one octet long and is the length of the CHALLENGE in octets. The CHALLENGE data field 590 is a random value number at least 32-bits long provided to the MN in a control message to and used to provide a local assurance at the Foreign Agent that the Mobile Node is not replaying an earlier registration request (e.g. not a replay attack).

Figure 6:
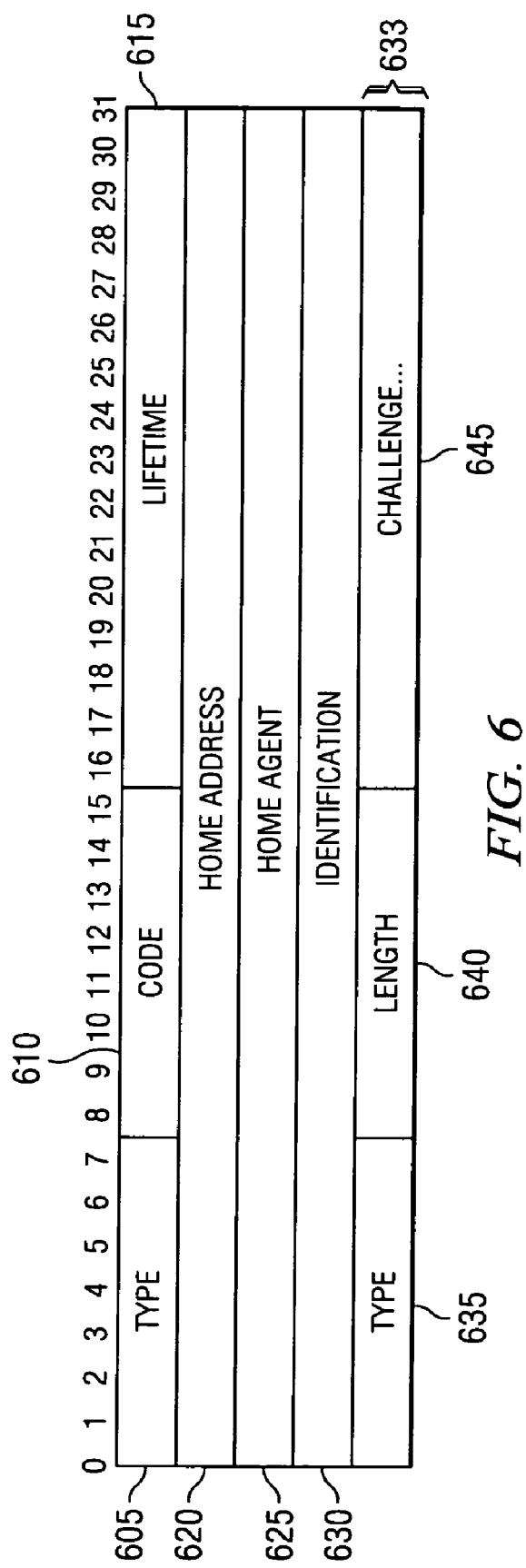
FIG. 6 is a format for a registration reply message used in the invention.

The format for a registration reply message containing a Challenge is shown in FIG. 6. The registration reply message follows the UDP header and includes 9 data fields. The TYPE data field 605 is one octet long and has a value of "3". The CODE data field 610 is a value signifying the result of the registration request. For a stale challenge, the outcome is denial of registration and the CODE data field 610 value is set at 106, signifying rejection because of receiving a stale challenge code. The LIFETIME data field 615 is the number of seconds remaining before the registration is considered expired, but if the CODE field 610 indicates registration denied, the contents of the LIFETIME data field 615 are unspecified and must be ignored upon reception. The HOME ADDRESS data field 620 is the IP address of the MN on the home network. The HOME AGENT data field 625 is the IP address of the MN's Home Agent on the home network. The IDENTIFICATION data field 630 is the 64-bit number identifier generated by the MN for matching a RRQ with a RRP and preventing replay attacks of registration messages on the home network. The value is based upon the IDENTIFICATION data field 575 from the Registration Request message.

The Challenge code extension 633 includes three data fields. The TYPE data field 635 is one octet long and has an assigned value of "24". The LENGTH data field 640 is one octet long and is the length of the CHALLENGE in octets. The CHALLENGE data field 645 is a random value number at least 32-bits long provided to the MN in this control message to used in subsequent information packets to provide a local assurance at the Foreign Agent that the Mobile Node is not replaying an earlier control message (e.g. not a replay attack).

Figure 7:
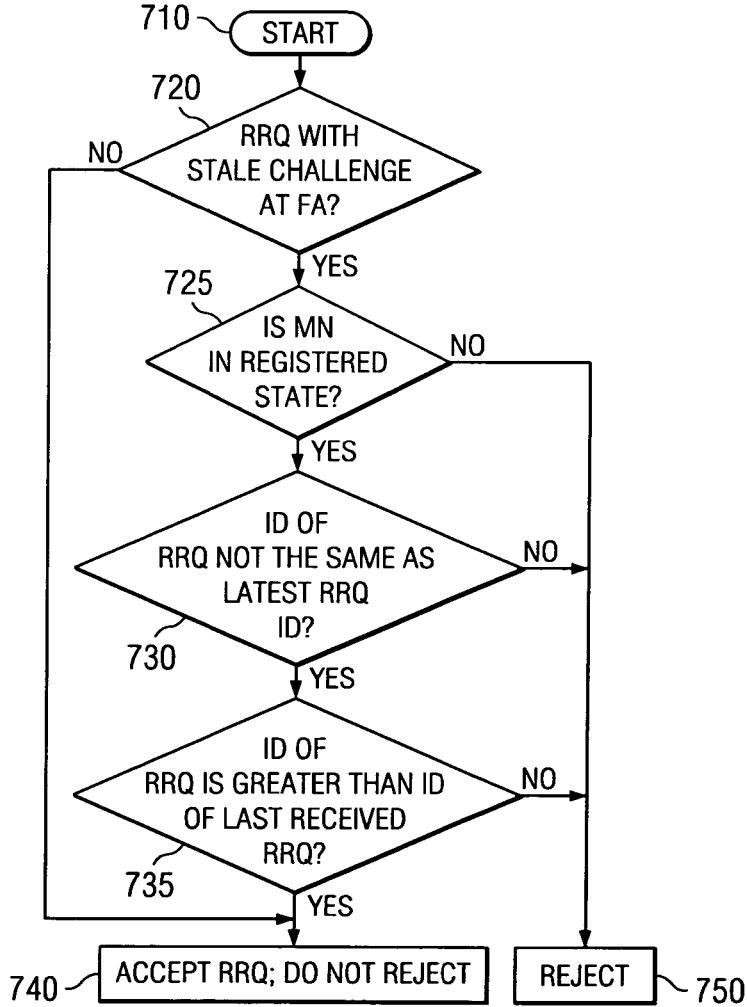
FIG. 7 is a logic chart showing the operation of the invention.

FIG. 7 shows a logic chart for the operation of the invention. The logic chart starts at step 710. At step 720, a registration request message (RRQ) is received at the FA. The FA processes the RRQ examining it for the Challenge code data. If the Challenge is the one expected by the FA, then the next step is 740. In step 740, the FA accepts the RRQ and transmits the RRQ message to the HA.

At step 720, if a stale Challenge is found, then the next step is 725. In step 725, the FA confirms the MN is in a registered state. If the MN is not in a registered step, then the next step is step 750 where the RRQ is rejected because of the stale Challenge code. If the MN is registered, the next step is step 730 where the FA examines the identifier code of the RRQ. If the Identifier (ID) of the RRQ is the same as the latest RRQ identifier, then the process goes to step 750 where the FA rejects the RRQ with a stale challenge code. If the ID of the RRQ is not the same as the latest RRQ ID, then the process proceeds to step 735.

In step 735, the FA determines if the ID of the received RRQ is greater than the ID of the last received valid RRQ. If the ID is not a greater value (e.g. a later timestamp), then the process proceeds to step 750 where the FA rejects the RRQ for the stale Challenge code. If the ID is a greater value than that of the last received RRQ, then the process proceeds to step 740. In step 740, the FA accepts and authenticates the RRQ and transmits the RRQ message to the HA. The FA will not reject the RRQ for the stale Challenge.

Figure 8:
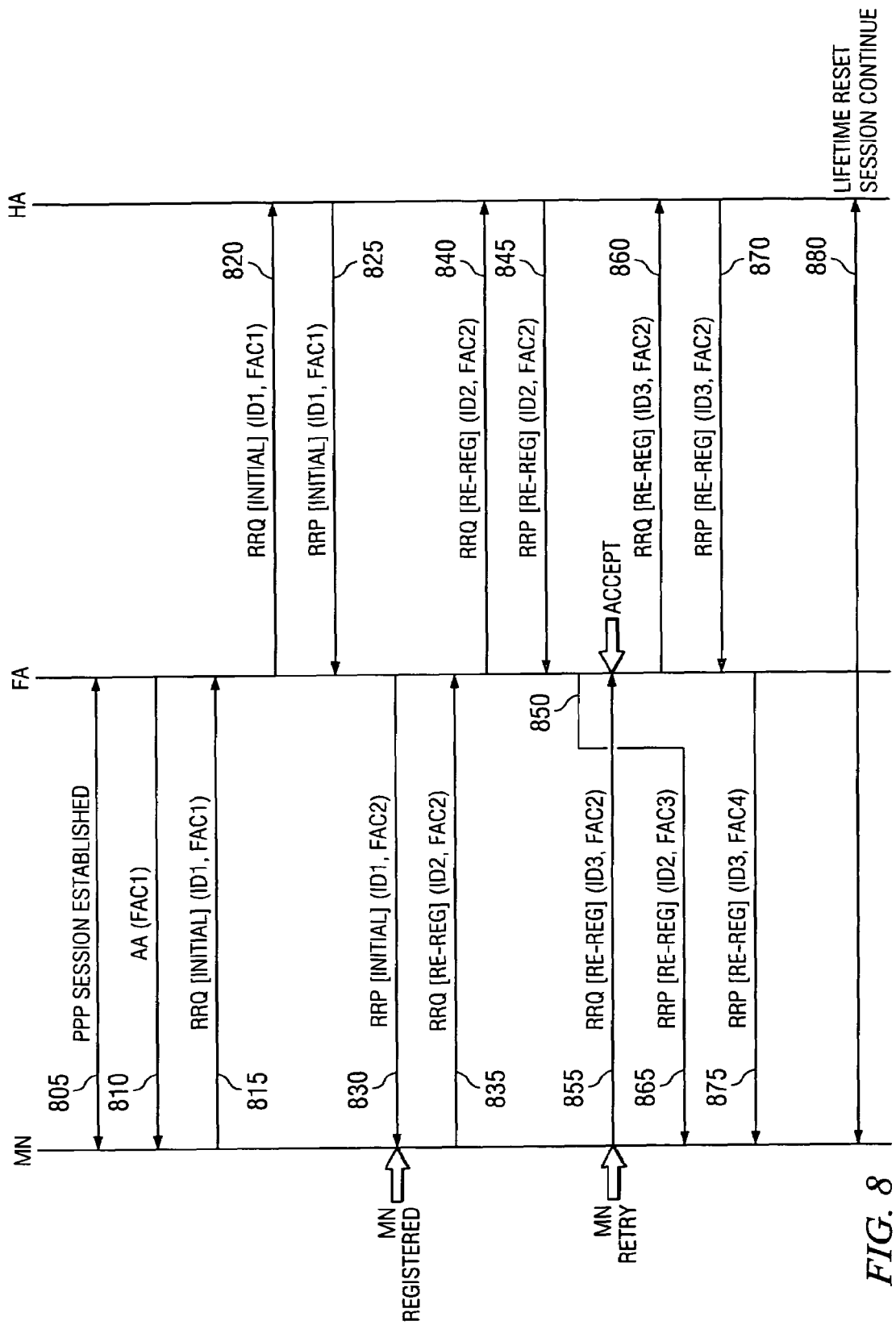
FIG. 8 is a message flow chart showing the registration and verification process using the invention.

The message flow using the invention is shown in FIG. 8. In step 805, a Point-to-Point Protocol (PPP) communication session with a Mobile Node (MN) is established. At step 810, the Foreign Agent (FA) transmits an agent advertisement message (AA) containing a first FA Challenge code number (FAC1) to the MN. Although a random number is used in the preferred embodiment, other alternative embodiments may consist of an alphanumeric or pure alpha challenge code randomly generated by the FA. The FAC1 received in the AA message is stored in a memory to use in the next control message transmitted by the MN until updated with a new Challenge code. By using the FAC1 to authenticate a message, the FA prevents replay attacks by rejecting any control messages that contain outdated, or stale, Challenge codes.

In step 815, the MN transmits an initial Registration Request message (RRQ) to the FA containing the FAC1 and a timestamp message Identifier (ID1) that establishes a unique identifier for the message to match the RRQ with the corresponding RRP. If a RRQ is received with a duplicated ID, it will be rejected by the HA. This remains an unchanged component of the authentication protocols to prevent replay attacks on the communication network.

At step 820, the FA transmits the initial RRQ to the Home Agent (HA) which includes the ID1 and the FAC1. The HA authenticates the identity of the MN and at step 825 generates and transmits an initial Registration Reply message (RRP) containing the ID1 and FAC1 attributes to the FA. In step 830, the FA correlates the RRP with the initial RRQ received in step 815 and transmits an initial Registration Reply message (RRP) with a new, second Challenge (FAC2) to use in any subsequent control message. After receiving the RRP message, the MN processes the information completing the registration procedure. The MN is now registered with the FA and HA and can now receive and transmit information packets in the communication session.

At the time of initiation, a lifetime clock is initiated. To reset the clock, periodic registration requests are sent by the MN to re-register the MN. At step 835, the MN transmits a Registration Request message (RRQ) to the FA to re-register the MN with the FA and the HA and reset the lifetime. The RRQ contains a new Identifier (ID2) and the new FAC2 received by the MN in step 830. In step 840, the FA transmits the RRQ to the HA so the HA can authenticate the identity of the MN and re-register the MN. In step 845, the HA transmits a RRP confirming re-registration of the MN. The RRP includes the ID2 and the FAC2 for processing the message.

In step 850, the FA transmits the RRP replying to the RRQ in step 835 to the MN containing the ID2 and a new third FA Challenge (FAC3). However, this message is delayed by congestion and does not arrive before a timeout occurs and the MN transmits a second RRQ in step 855 because of failure to receive the RRP within an allocated time frame after step 835. The message transmitted at step 855 includes a new, third Identifier (ID3) and the old challenge (FAC2).

Rather than rejecting the RRQ because of the stale FAC2, the FA processes the RRQ under the enhanced protocol of the invention. The FA processes the RRQ determining that the FAC2 is an expired challenge code and that the MN is in a registered state. The ID3 is not the same as the ID2 identifier of the latest received RRQ, and the ID3 is a higher value timestamp identifier than the ID2 contained in the latest RRQ. This verifies that the information packet was formed subsequent to the information packet in step 835. The test conditions of 1) the MN is registered, 2) ID3 is not equal to ID2, and 3) ID3 is greater in value to ID2 are met. Because these three test conditions are met, the FA accepts and authenticates the RRQ even though it contains an expired challenge code (e.g. the stale FAC2). In step 860, the FA transmits the RRQ for re-registration to the HA containing the ID3 and FAC2 where the HA authenticates the identity of the MN and re-registers the MN.

At step 865, the delayed RRP message containing the ID2 and the new FAC3 arrives at the MN. The MN updates its memory with the new FAC3 to use for authentication in its next control message. But because the identifier does match the ID3 identifier code that the MN is expecting, the message is discarded due to the identifier code mismatch. In step 870, the HA transmits a RRP containing the ID3 and the FAC2 and the code for successful registration to the FA. Before a time out occurs, at step 875, the HA transmits the RRP containing the ID3 and a new Challenge (FAC4) with a code for successful re-registration. In step 880, the lifetime is reset because of the successful re-registration and the communication session continues.

While the invention has been particularly shown and described with respect to preferred embodiments, it will be readily understood that minor changes in the details of the invention may be made without departing from the spirit of the invention.

Having described the invention,

We claim:

1. A packet-based wireless communication system, comprising:
    a home network coupled to a home agent associated with a mobile node, the home network having a communication link to a foreign network coupled to a foreign agent, said mobile node being coupled by a wireless communication link to the foreign agent, said foreign agent supporting routing information packet transmissions between the mobile node and the home network;
    the foreign agent being adapted to receive a first registration request message transmitted from the mobile node to the foreign agent containing a first identifier code and a first challenge code, which results in the mobile node being placed in a registered state with the foreign agent; and
    the foreign agent being adapted to receive a second registration request message transmitted from the mobile node to the foreign agent containing a second challenge code and a second identifier code after receiving an interim registration request message from the mobile node containing the second challenge code and an interim identifier code, said foreign agent being adapted to accept the second registration request message if the second identifier code is not equal to the first identifier code or the interim identifier code and the second challenge code is a current or previously valid challenge code.

2. The packet-based wireless communication system of claim 1 wherein the second challenge code is received by the mobile node in an agent advertisement message.

3. The packet-based wireless communication system of claim 1 wherein the second challenge code is received by the mobile node in a registration reply message.

4. The packet-based wireless communication system of claim 1 wherein an authentication protocol at the foreign agent rejects the second registration message if the second identifier code value equals the first identifier code value.

5. The packet-based wireless communication system of claim 1 wherein an authentication protocol at the foreign agent rejects the second registration message if the second identifier code value is less than the first identifier code value.

6. The packet-based wireless communication system of claim 1 wherein an authentication protocol at the foreign agent accepts the second registration message if the second identifier code value is greater than the first identifier code value.

7. The packet-based wireless communication system of claim 1 wherein the identifier code values are based on a timestamp.

8. A method for packet-based wireless communication for a mobile node coupled to a foreign agent, comprising the steps of:
    transmitting a first information packet requesting service to the foreign agent from the mobile node containing a first identifier code and a first challenge code;
    transmitting a second information packet requesting service to the foreign agent from the mobile node containing a second identifier code and a second challenge code after an interim registration information packet request is received at the foreign agent from the mobile node, said interim registration information packet request containing the second challenge code and an interim identifier code, and
    authenticating the second information packet if the mobile node is in a registered state and the second identifier code is not the same as the first identifier code or the interim identifier code and the second challenge code is a current or previously valid challenge code.

9. The method for packet-based wireless communication for a mobile node coupled to a foreign agent of claim 8 wherein the second information packet comprises a registration request message.

10. The method for packet-based wireless communication for a mobile node coupled to a foreign agent of claim 9 further comprising the step of:
    rejecting the second information packet if the first identifier code value equals the second identifier code value.

11. The method for packet-based wireless communication for a mobile node coupled to a foreign agent of claim 9 further comprising the step of:
    rejecting the second information packet if the first identifier code value is greater than the second identifier code value.

12. The method for packet-based wireless communication for a mobile node coupled to a foreign agent of claim 9 further comprising the step of:
    accepting the second information packet if a second challenge code has already been received at the foreign agent from the mobile node in said interim information packet message subsequent to a first receipt of the first challenge code, said second code used to validate an earlier transmitted registration request message.

13. The method for packet-based wireless communication for a mobile node coupled to a foreign agent of claim 8 wherein the identifier codes are associated with a timestamp.

14. The method for packet-based wireless communication for a mobile node coupled to a foreign agent of claim 8 further comprising the step of:

rejecting the second information packet if the second identifier code indicates that it was transmitted by the mobile node prior to the first identifier code.

15. A method for packet-based wireless communication for a mobile node coupled to a foreign agent, comprising the steps of:
   receiving a first registration request message at the foreign agent containing a first identifier code and a first challenge code;
   receiving a second registration request message at the foreign agent containing the first challenge code and a second identifier code after receiving an interim registration request message from the mobile node containing the second challenge code and an interim identifier code,
   verifying the mobile node is in a registered state; and
   authenticating the second registration request message using an authentication protocol operating on the foreign agent if the second identifier code was generated after the first identifier code and said second challenge code is a current or previously valid challenge code.

16. The method for packet-based wireless communication for a mobile node coupled to a foreign agent of claim 15 further comprising the step of:
   refusing to authenticate the second registration request message if the first identifier code equals the second identifier code.

17. The method for packet-based wireless communication for a mobile node coupled to a foreign agent of claim 15 further comprising the step of:
   refusing to authenticate the second registration request message if the second identifier code is less than the first identifier code.

18. The method for packet-based wireless communication for a mobile node coupled to a foreign agent of claim 15 wherein the first identifier code and the second identifier code signify the relative order of transmission of the first and second registration request messages.

19. A router for use on packet-based wireless communication system communicating with a mobile node coupled to a foreign agent, comprising:
   the router being adapted to operate as a foreign agent that receives a first registration request message transmitted from the mobile node to the foreign agent containing a first identifier code and a first challenge code, which results in the mobile node being placed in a registered state with the foreign agent; and
   the foreign agent being adapted to receive a second registration request message transmitted from the mobile node to the foreign agent containing a second challenge code and a second identifier code after receiving an interim registration request message from the mobile node containing the second challenge code and an interim identifier code, said foreign agent being adapted to accept the second registration request message if the second identifier code is not equal to the first identifier code or the interim identifier code and the second challenge code is a current or previously valid challenge code.

20. The router for use on packet-based wireless communication system communicating with a mobile node coupled to a foreign agent of claim 19 wherein the second challenge code is received by the mobile node in an agent advertisement message.

21. The router for use on packet-based wireless communication system communicating with a mobile node coupled to a foreign agent of claim 19 wherein the second challenge code is received by the mobile node in a registration reply message.

22. The router for use on packet-based wireless communication system communicating with a mobile node coupled to a foreign agent of claim 19 wherein an authentication protocol at the foreign agent rejects the second registration message if the second identifier code value is equal to or less than the first identifier code value.

23. The router for use on packet-based wireless communication system communicating with a mobile node coupled to a foreign agent of claim 19 wherein an authentication protocol at the foreign agent accepts the second registration message if the second identifier code value is greater than the first identifier code value.

24. The router for use on packet-based wireless communication system communicating with a mobile node coupled to a foreign agent of claim 19 wherein the identifier code values are based on a timestamp.

* * * * *